Jan. 28, 1964    R. J. G. STEINER    3,119,285
SAFETY DEVICE FOR A MACHINE TOOL
Filed Sept. 28, 1962    2 Sheets-Sheet 1
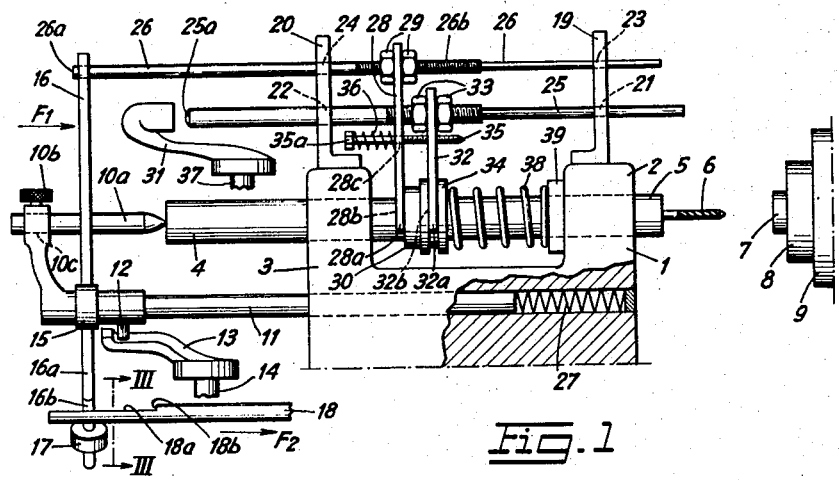
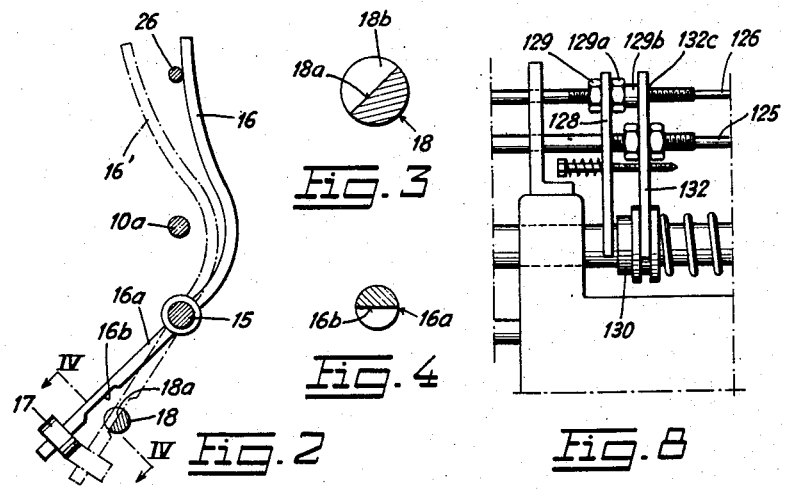

United States Patent Office 3,119,285
Patented Jan. 28, 1964

3,119,285
SAFETY DEVICE FOR A MACHINE TOOL
René Jean Georges Steiner, Montmorency, Seine-et-Oise, France, assignor to Usines Tornos, Fabrique de Machines Moutier S.A., Moutier, Canton of Berne, Switzerland, a joint-stock company
Filed Sept. 28, 1962, Ser. No. 226,858
Claims priority, application France Oct. 6, 1961
8 Claims. (Cl. 77—5)

This invention relates to safety devices for machine tools and in particular to a device to stop a machine tool when tool breakage occurs.

It is well known that machine-tools operating automatically, such as lathes, require special supervision in order to avoid the production of a large number of defective pieces when a tool breakage occurs.

Furthermore, in many instances it is difficult to locate and pick out the defective pieces among the good pieces which were produced before the breakdown occurred and conforming to specifications. On the other hand if each piece is worked upon by a series of machines or tools in the usual production line manner, the introduction of a piece which was not properly worked upon into a machine or tool further down the production line may bring about damage to a number of tools and entire machines.

It is, therefore, of great interest that the machine-tool operating automatically possesses a safety device capable to bring about an immediate stoppage of the machine when a broken tool is exposed to a piece to be worked upon.

According to the invention, there is contemplated in a machine of the lathe type having a frame, a tool carrier mounted for movement relative to said frame and adapted to carry a tool, and means for axially advancing said tool carrier towards a work piece, a safety device for stopping the machine in case of tool breakage which comprises a member movably mounted with respect to said frame, a means selectively moving the member at the time when a tool contacts the work piece if the tool is unbroken, a yieldable member connecting the member and the tool for moving the tool closer to the work piece if the tool is broken and means responsive to the additional movement of the tool caused by the yieldable member when the tool is broken for stopping said machine.

Other features of the present invention will be set forth or apparent in the following description and claims and illustrated in the accompanying drawings, which disclose by way of example and not by way of limitation, in a limited number of embodiments, the principle of the invention and structural implementations of the inventive concept.

In the drawings, in which like reference numbers designate like components in the several views:

FIG. 1 is an elevation view partially in section of a safety device according to the invention, arranged on a drilling pin of an automatic turning lathe; and FIG. 2 is an end veiw in the direction of arrow F1 in FIG. 1 of the safety finger and of the elements cooperating with it;

FIG. 3 is a sectional view taken on line III—III of FIG. 1;

FIG. 4 is a sectional view taken on line IV—IV of FIG. 2;

FIG. 8 is a partial elevation view of another embodiment of the invention.

Figure 5:
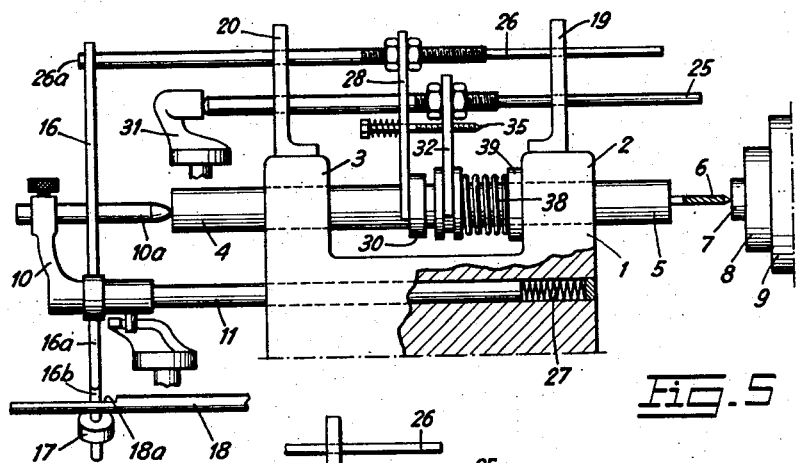
FIG. 5 is an elevation view of the machine of FIG. 1 at a different time of the operating cycle.
Figure 6:
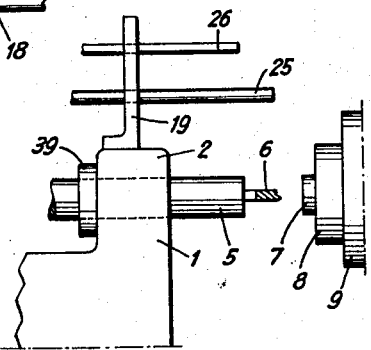
FIG. 6 is a partial elevation view illustrating the machine of FIG. 1 when a drill tool is broken.
Figure 7:
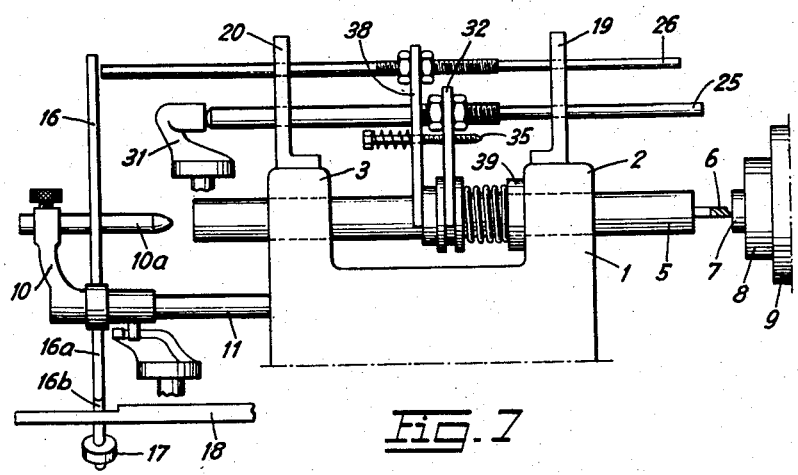
FIG. 7 is an elevation view of the machine of FIG. 1 at still a different time of the operating cycle.

In the drawings, the frame 1 of the automatic lathe have fixed thereto bearing blocks 2 and 3 which support a drilling pin 4 mounted in the bearing blocks. One end of the drilling pin 4 has a mandrel 5, in which is secured a drill 6. A piece to be drilled 7 is mounted in jaws of a chuck 8 carried by a bearing block 9 which may be integral with the frame. For sake of simplification, the device which turns the pin 4 is not shown in the drawings.

A principal pushing element 10 comprises a pushing stem 10a, which is coaxial with the pin 4 and is slidably mounted in a bore 10c of the body of the pushing element 10, the pin 4 being axially immobilizable in a suitable position with the help of an anchoring screw 10b.

The pushing element 10 is carried by a stem 11, with which it may be integral therewith, slidably mounted in the frame 1. Stem 11 carried a spur 12 which engages the extremity of a lever 13, oscillatably mounted on a vertical shaft 14 and subjected to the action of a cam (not shown) which is carried along synchronically with the general movement of the lathe. The lever 13 determines the positive movement of the pushing element 10 whose return movement is ensured by a restoring spring 27 acting upon the extremity of the stem 11.

A coupler 15 rotatably mounted upon and coaxial with the stem 11 carries an extended safety finger 16, one extending portion 16a of which terminates in an end portion 16b which is equipped with a counter-weight 17, portion 16b being thicker on one side than on the other to form a notch. Stem 18 has a portion 18a, also thicker on one side than on the other side to form a notch, which is intended to take the support of the stem 18, for controlling the stopping of the machine.

Bearing block 2 supports a plate 19 having spaced bores 21 and 23 for guiding a stem 25 of an auxiliary pushing peice and a stem 26, respectively. Bearing block 2 supports a plate 20 having bores 22 and 24 aligned with bores 21 and 23, respectively, so that stems 25 and 26 are slidably held in parallel arrangement with the axis of the pin 4.

Safety finger 16 when displaced as shown in FIG. 2 would normally rotate under the action of gravity upon the counterweight 17. However, the extremity 26a of stem 26 engages the safety finger 16 so that 16b does not contact 18a as shown in full lines on FIG. 2.

Forked member 28 is fixed at one extremity on a stem 26 by nuts 29 which cooperate with a threaded portion 26b of stem 26. The other extremity of 28 constituting the fork proper has two branches 28a and 28b which embrace the pin 4 and engage a shoulder-piece 30, the latter preferably being a ring, connected with and fixed to the pin 4 by any suitable means. The fork 28 also has a section with holes 28c, traversed by a screw 35, as it will be explained below.

Another forked member 32 is fixed on the stem 25 by nuts 33 which cooperate with a threaded portion 25b of stem 24, fork 32 and the threaded stem 25 constituting the auxiliary pushing element. Branches 32a and 32b of the fork 32 embrace a necked block 34 mounted free to rotate and to travel on the pin 4 and susceptible to touching the shoulder-piece 30.

The screw 35 freely passes through the hole 28c in fork 28 and is engaged in a threaded hole in the fork 32. A spiral spring 36 is interposed between the head 35a of the screw 35 and the fork 28, in such a manner that a movement of the stem 25 in the direction of approaching the tool, brings about a corresponding movement of the fork 28, of the stem 26 and, through the shoulder-piece 30, of the pin 4, provided that no obstacle prevents the movement of the pin.

The stem 25 is subjected, on the portion of its trajectory when the intact tool comes into contact with the piece to be worked upon, to the action of a lever 31, oscillatably mounted around a vertical shaft 37 and obeying a cam (not shown) which turns synchronically with the cam controlling the lever 13.

Also, a spiral spring 38 is interposed between the necked block 34 and a shoulder-piece 39 of the block 2, in a manner to insure the total return of the device to its starting position as soon as the levers 13 and 31 stop their action.

The device operates in the following manner:

The safety finger 16 is preliminarily placed to support itself on the extremity 26a of the stem 26.

The pin 4 is in its extreme withdrawn position relative to the piece 7. The spring 38, through the necked block 34 and the shoulder-piece 30, keeps the pin 4 pushed against the pushing stem 10a. The screw 35 is regulated in a manner that the spring 36 exerts a slight pressure on the fork 28 and keeps it, thus, applied against the shoulder-piece 30. The lever 31 is not in contact with the extremity 25a of the stem 25.

Under these conditions, the lever 13, under the impulse of its control cam, carries along the pushing element 10 and, consequently, the pin 4 and drill 6 towards the work piece 7. The shoulder-piece 30 will push before it the fork 32 by means of the necked block 34 thereby compressing the spring 38. During this movement, the screw 35 and the spring 36 keeps the fork 28 applied against the shoulder-piece 30. The safety finger 16 travels with the pushing mechanism and hence there is no relative movement between it and the stem 26.

During this phase of the operating cycle, the lever 31 has no contact with the extremity 25a of the stem of the auxiliary pushing element.

At the exact moment when the drill 6 comes into contact with the piece 7 to be worked upon (FIG. 5), the lever 31 under the impulse of its control cam (not shown), suitably arranged, gives a brief impulse to the stem 25 of the auxiliary pushing element, in a manner to confer to it a certain advance in respect to the position, which it would attain under the simple push of the pin 4.

If the drill 6 is in good condition, the point of the drill is maintained in contact with the piece 7 to be worked upon and the advance of stem 25 relative to pin 4 has simply as effect to compress the spring 36 against the fork 28, the latter bearing upon the shoulder-piece 30 of the pin. There exists no relative movement between the safety finger 16 and the bolting stem 26, and the safety finger remains, thus, in its initial held position, illustrated in solid lines in FIG. 2 and its stem 16a cannot cooperate with the stem 18 the latter controlling the stopping of the lathe. The point of drill 6 not being broken, the operating cycle can proceed normally.

However, when the drill is broken during the preceding cycle, the remaining portion of the broken drill is not in contact with the piece 7 to be worked upon, at the moment when the lever 31 pushes the stem 25 for imparting a slight advance to the latter. Accordingly, when stem 25, fork 32 and screw 35 is advanced as a rigid unit by lever 31, fork 28 pushed by the action of spring 36 advances shoulder 30 and pin 4, the latter being movable to the extent that the point of drill 6 is missing. The advancement of fork 28 advances stem 26 thereby releasing safety finger 26 for movement in a counterclockwise direction by gravity under the influence of counterweight 17 as shown by broken lines in FIG. 2. The notched portion 16b of safety finger 16 then engages the notched portion 18a of rod 18. The axial movement of safety finger 16 by the movement of element 10 along with pin 4 causes rod 18 to be moved axially and notch 16a engages shoulder 18b. Axial movement of rod 18 causes the machine to stop as explained hereinbefore.

It is quite obvious that the sensibility of the device, that is the minimum length of the broken part of the tool, capable to bring about the stopping of the machine, is a function of the initial regulation of the relative positions of the safety finger 16 and of the bolting stem 26. This regulation is performed with the help of threaded nuts 29. The regulation of the auxiliary pushing element is performed by threaded nuts 33, while the screw 35 regulates the compression of the spring 36, in a manner to reliably ensure the carrying along of the pin 4 with stem 25, particularly during the phase of differential movement of the auxiliary pushing element in case the tool is broken.

Under practical operating conditions, it would be desirable to avoid the continuing contact between the fork 28 and the shoulder 30 which revolves with pin 4. For this purpose, the device is modified in a manner shown in FIG. 8, in which the elements corresponding to those in FIG. 1 to FIG. 7 have the same reference numbers increased by 100. In FIG. 8, the fork 132 of the auxiliary pushing element has an extension with a bore 132c which permits stem 126 to pass therethrough with clearance. Also a cylindrical spacer member 129b is fixed to either nut 129 or forked member 132. The length of the cylindrical spacer 129b is such that it keeps the fork 128 slightly removed from the bearing shoulder 130 of the tool carrying pin before stem 125 is given a small axial movement as explained hereinbefore.

When the stem 125 receives the push of the lever 31 (FIG. 1) and the drill tool is broken, fork 132 tends to move away from the fork 132 but for the action of spring 36, the fork 128 comes into contact with the bearing 130 as explained hereinbefore and stem 126 moves to stop the machine.

While there has been described and pointed out the fundamental novel features of the invention as applied to preferred embodiments, it will be understood that various omissions and substitutions and changes in the form and details of the devices illustrated and its operation may be made by those skilled in the art, without departing from the spirit of the invention. It is the intention, therefore, to be limited only as indicated by the scope of the following claims.

What is claimed is:

1. In a machine of the lathe type having a frame, a tool carrier mounted for movement relative to said frame and adapted to carry a tool, and means for axially advancing said tool carrier towards a work piece, a safety device for stopping the machine in case of tool breakage which comprises a member movably mounted with respect to said frame, a means selectively moving said member at the time when said tool contacts said work piece if the tool is unbroken, a yieldable member connecting said member and said tool for moving said tool closer to said work piece if the tool is broken and means responsive to the additional movement of said tool caused by the yieldable member when said tool is broken for stopping said machine.

2. In a machine of the lathe type having a frame, a tool carrier mounted for axial movement relative to said frame and adapted to carry a tool, and a first means for axially advancing said tool carrier towards a work piece, a safety device for stopping the machine in case of tool breakage which comprises a first, second and third member each slidably mounted with respect to said frame, a second means mounting said first member for axial movement with said tool carrier, said first member pivotably carrying a safety finger one end of which is engageable with one end of said second member, a third means imparting a selected axial movement to said third member at the time when said tool normally engages said work piece if the tool is unbroken, a fourth means carried by said third member which resiliently engages said tool carrier to move it closer towards said work piece in the event that said tool is broken, a fifth means coacting between said tool carriers and said second member for imparting axial movements of said tool member to said second member caused by movements of said tool carrier in the event of tool breakage, said safety finger being biased so that it bears against and is held from rotational movement by said second member until said tool carrier is advanced by said third means in the event of tool breakage and a sixth means responding to rotational movements of said safety finger for stopping said machine.

3. The combination according to claim 2 wherein said fourth means comprises a forked member rigidly carried by said third member, a grooved member slidably carried by said tool carrier and engaging said first forked member, a shouldered member fixably carried by said tool carrier, a second forked member fixably carried by said second member and means for urging said two forked members together so that the second forked member engages said shouldered member.

4. The combination according to claim 3 wherein said last mentioned means includes a threaded member secured to said first forked member, and passing through said second forked member, said threaded member having a shouldered portion at one end thereof, and a compression spring between said shouldered portion of the threaded member and said forked member.

5. The combination according to claim 4 wherein said first means includes a pushing element engageable with said tool carrier, means connecting said tool carrier and said first member, a cam follower depending from said first member and a cam controlling said cam follower and wherein there is included in said combination resilient means urging said tool carrier away from said work piece and against said pushing element.

6. The combination according to claim 5 wherein said third means includes a lever selectively making contact with said third member.

7. The combination according to claim 6 wherein said sixth means is a notched rod, safety finger upon rotation engaging said notched rod and moving the notched rod axially.

8. The combination according to claim 2 wherein said fourth means includes a first forked member fixed to said third member, said first forked member having an aperture to freely pass said second member, a grooved member slidably and rotatably mounted upon said tool carrier and engaging said forked member, the second forked member being carried by said second member, a shouldered member fixed to said tool carrier, spacing means between said first and second forked member so that said second formed member does not bear against said shoulder means, a threaded member secured to said first forked member and passing freely through said second forked member, said threaded member having a shouldered portion, and a compression spring between the shouldered member of said threaded member and said second forked member.

References Cited in the file of this patent

UNITED STATES PATENTS

| | | |
|---|---|---|
| 1,289,390 | Calleson | Dec. 31, 1918 |
| 1,555,098 | Benko | Sept. 29, 1925 |
| 1,981,147 | Moller | Nov. 20, 1934 |